United States Patent [19]

Kückens

[11] 4,293,081

[45] Oct. 6, 1981

[54] METHOD AND DEVICE FOR METERED DISPENSING OF LIQUIDS, IN PARTICULAR CONCENTRATES OR SYRUPS, FOR THE PRODUCTION OF BEVERAGES

[75] Inventor: Alexander Kückens, Hamburg, Fed. Rep. of Germany

[73] Assignee: Dagma Deutsche Automaten und Getrankemaschinen GmbH & Co. KG, Fed. Rep. of Germany

[21] Appl. No.: 62,695

[22] Filed: Aug. 1, 1979

[30] Foreign Application Priority Data

Aug. 3, 1978 [DE] Fed. Rep. of Germany ....... 2834095
May 22, 1979 [DE] Fed. Rep. of Germany ....... 2920747

[51] Int. Cl.³ .............................................. B67B 7/26
[52] U.S. Cl. ..................................... 222/83; 222/211
[58] Field of Search ................. 222/83, 83.5, 211, 81, 222/82, 88, 1, 215; 99/295

[56] References Cited

U.S. PATENT DOCUMENTS

| | | | |
|---|---|---|---|
| 3,018,926 | 1/1962 | Gilstrap | 222/211 X |
| 3,139,343 | 6/1964 | Baselt | 99/295 |
| 3,347,420 | 10/1967 | Donoghue | 222/211 X |
| 3,987,791 | 10/1976 | Chittenden et al. | 222/83 X |
| 4,146,153 | 3/1979 | Bailen | 222/83 |

*Primary Examiner*—Stanley H. Tollberg
*Attorney, Agent, or Firm*—Whittemore, Hulbert & Belknap

[57] ABSTRACT

A device for and method of metered dispensing of liquids. The device comprises a dispensing container, a sealed compensating vessel positioned within the dispensing container and engaged therewith about the opening of the dispensing container and a dosing structure positioned in the opening of the dispensing container and extending into the dispensing container and compensating vessel, said dosing structure and dispensing container having portions cooperable to form a continuous reinforcing bridge between two opposed flexible wall portions of the container. The method includes first creating a vacuum in the dispensing container prior to breaking the seal of the compensating vessel with a portion of the dosing structure by spreading the flexible wall portions of the container with the reinforcing bridge.

12 Claims, 6 Drawing Figures

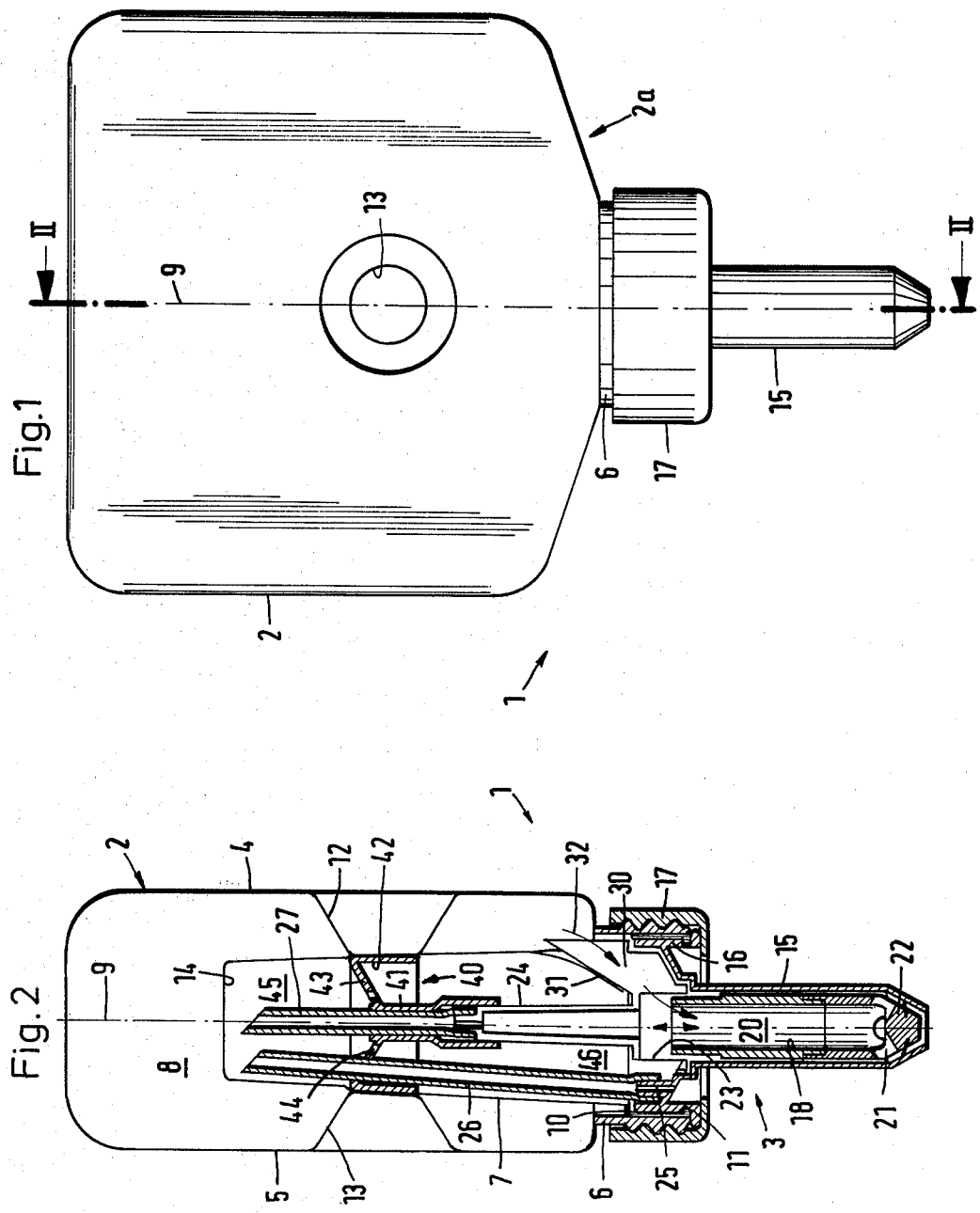

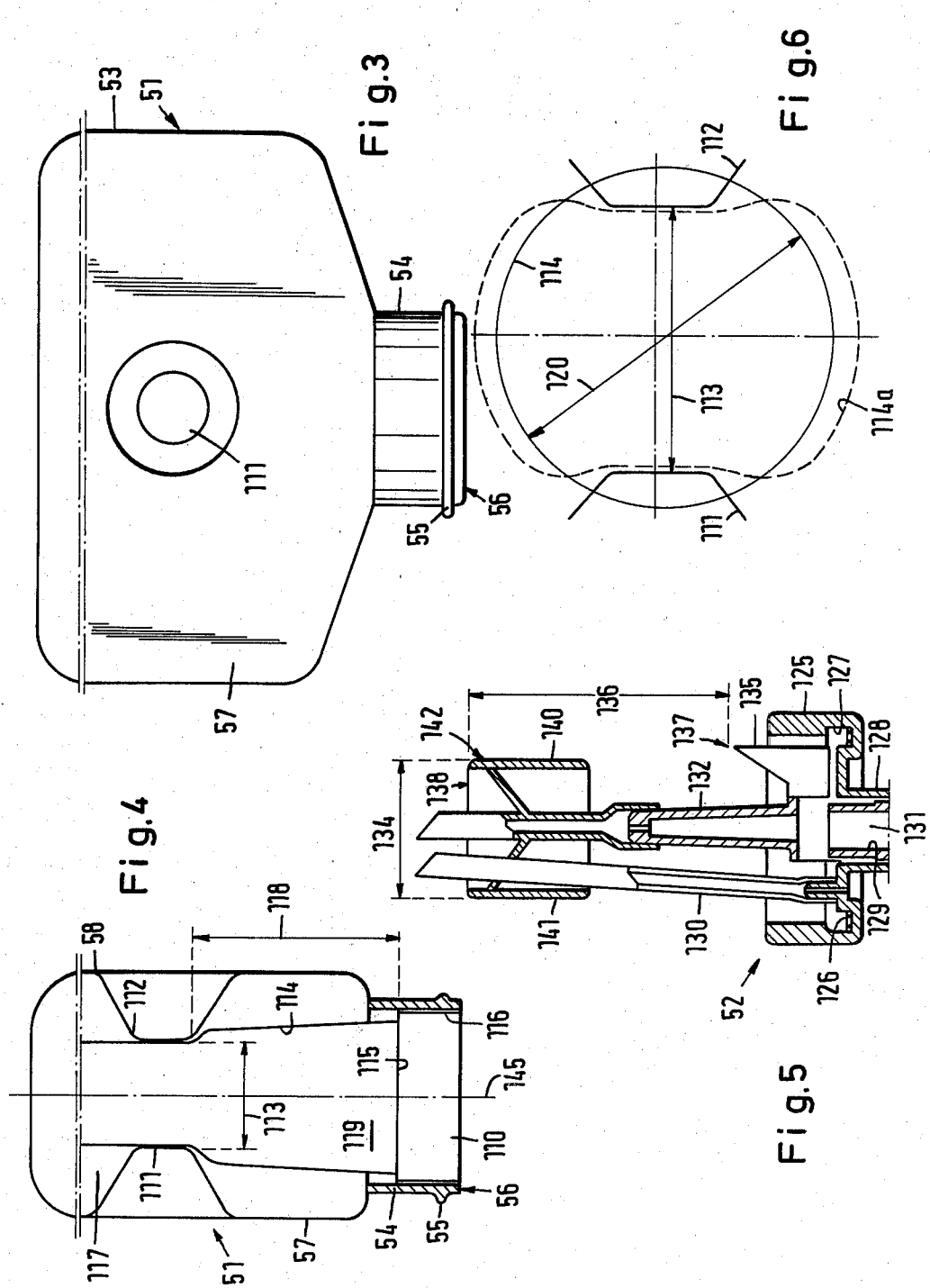

METHOD AND DEVICE FOR METERED DISPENSING OF LIQUIDS, IN PARTICULAR CONCENTRATES OR SYRUPS, FOR THE PRODUCTION OF BEVERAGES

The invention relates to a method and a device for metered dispensing of liquids, in particular concentrates or syrups, for the production of beverages.

Such a device is known from German Offenlegungsschrift No. 25 44 671. The container of said known device is made of plastics and has a somewhat oblong rectangular cross-section in sections perpendicular to the container axis. The container is comparatively thin-walled, so that at least the wide peripheral sides of the container are highly flexible. The upper end of the container is conically constricted and terminates in a threaded neck portion defining an outlet opening. In the interior of the container there is arranged a compensating vessel which is open only toward the outlet opening and is sealingly connected with the rim of the container neck, so that the compensating vessel forms at the same time a hermetic closure for the container. The container is filled with the liquid up to the brim and closed with the compensating vessel, the open side being in most cases additionally closable with a tear-off top in order to prevent any sort of contamination. In this way the filled container can be conveyed and stored. For metered dispension of the liquid contained in the container, the open side of the compensating vessel is exposed, for instance by ripping the tear-off top, and a dosing means is sealingly secured to the neck portion of the container by a screw cap. The dosing means comprises an elongated cylindrical housing member wherein a hollow cylindrical dosing valve is axially movably arranged. At its lower end the latter is provided with a valve seal sealing the outlet of the housing and above the valve seal it is provided with openings for the outlet of the liquid from the valve member. The upper end is open and in free flow communication with the interior of the container, so that, when the valve member assumes its lower position, the syrup or other liquid is permitted to flow into the interior of the valve member which serves at the same time as metering chamber. By an actuating means, in particular a magnet coil, the valve member can be moved to the upper position, in which the feed opening is locked and the outlet opening is released. In addition, the dosing means is provided with a tool which, when the dosing means is secured to the neck of the container, exposes or produces at least one opening in the compensating vessel, by which the interior of the container is set in flow communication with the inlet openings in the area of the lower edge of the compensating vessel. In addition, the interior of the valve member is in constant communication with the interior of the compensating vessel by a venting tube, said compensating vessel being in constant communication with the atmosphere by a second venting tube and a channel in the housing of the dosing means, when the container and the dosing means are connected with each other in operating position. In operating position the container is in overhead position, meaning that its neck points downwardly.

This arrangement results in a container which, when connected with a dosing means, serves at the same time for metered dispensing of the liquid, the arrangement being such that during the entire withdrawal of the liquid the pressure actually destined for withdrawal is determined, independently of the filling level of the liquid in the container, solely by the boundary between the air in the compensating vessel and the liquid adjacent the lower edge of the compensating vessel.

The device is destined and suited especially for immediate production of beverages, such as carbonized beverages, by means of automatic beverage dispensers or pouring out devides according to the postmix method. The device is particularly suited for unskilled personnel. All what is to be done by the personnel to obtain a dosing means ready for use is to buy the desired liquid or syrup in the container and, after removal of the protective cover, connect the dosing means with the container and insert the same with effortless ease in the automatic dispenser. Expediently the container is a throw-away container, whilst the dosing means can be repeatedly used.

Whilst the known device operates very satisfactorily and is especially suited for transportation and storage of liquids and, in connection with the dosing means, ensures a reliable and quick metering also of liquids that cannot easily be dosed, it was yet found that, due to incautious handling, especially after connecting the dosing means with the container and prior to inserting the thus connected unit into the automatic dispenser, problems may arise in that, by pressure applied to the flexible walls of the container, part of the syrup or of the liquid may penetrate to the compensating vessel or, even worse, fill the compensating vessel with the liquid, so that the reliable operation of the device is impaired. In this connection it is to be kept in mind that in the moment of connection between the container and the dosing means the opening for communication between the inside of the container and the inside of the compensating vessel is exposed, so that in this condition a free flow between compensating vessel and container takes place. The danger of liquid penetrating to the compensating vessel and thus rendering the device unserviceable arises not only from the flexibility of the container wall, but also from inexpert handling of the container, i.e. when the container is repeatedly turned from the overhead position to the normal position, as in consequence of the respective movements liquid may likewise intrude into the compensating vessel.

To produce the container from so stiff a material as to exclude flexibility of the walls under the action of normal forces, on the one hand, would not completely remove the difficulties and, on the other hand, would amount to such an expenditure of material that for a typical mass-produced article the container would be too expensive. Also such container shapes that would permanently prevent the flexible walls from bending by mutual support thereof or the like would amount to too great an expenditure, in particular in view of the compensating vessel to be installed, which itself consists of flexible material.

It is an object of the present invention to remove all these difficulties in a simple way and to render handling of such device by incautious and unskilled personnel a great deal safer.

As to one aspect of the invention the above problem is solved in that at least the container, preferably also the dosing means, is provided with rigid supporting members which, in assembled condition of container and dosing means, form a continuous reinforcing bridge between the two opposed flexible wall portions of the container.

This construction permits the container to be made of thinwalled, flexible material, so that it may be produced with little expenditure of material and low costs as a throwaway container or mass-produced article, respectively. The same applies also to the compensating vessel arranged within the container. The flexibility of the container has no detrimental effect prior to the initial use, when the container is hermetically closed, as the connection between the compensating vessel and the inside of the container is hermetically precluded. But as soon as the container is connected for use with the dosing means, the connection between the inside of the container and the compensating vessel being automatically established in the known way, there is produced by the proposed measures a substantially rigid bridge of material by which compression of the container walls, with the effect that from the inside of the container the substance is pressed into the compensating vessel, is prevented. A substantial portion of said bridge is formed by a portion of the dosing means, which, same as the dosing means as such, can indefinitely be used again. Only a small portion of said bridge is formed by respective deformations adjacent the flexible walls. At the same time it is ensured by such apportioning of the bridge between the container and the dosing means, that it can be formed uninfluenced by the position of the compensating vessel. The disposition of the bridge of material is such that the walls of the compensating vessel penetrate through the bridge of material.

The portion of the bridge of material allotted to the dosing means can advantageously be so improved that in operating position, in which the container is connected with the dosing means, the inside of the compensating vessel is divided into two chambers, with the two small venting tubes opening into the chamber between the bridge portion and the bottom of the compensating vessel, said portion of the chamber being practically separated from the front portion of the compensating vessel. The opening area of the small air channels or tubes remains thus virtually with absolute security free from the influence of the liquid with the result that, even when the device is temporarily placed on a flat side after connection of the container with the dosing means, liquid can enter practically only the front portion of the compensating vessel and flow downwardly after the device has been put in operating position.

In this way, the security in handling the device is considerably improved without adding appreciably to the necessary expenditure of the device.

As to another aspect of the invention the device is adapted to be used in such a way that as a first step of connecting the container and the dosing means a vacuum is created in the liquid containing chamber of the container by deforming the outer wall of said container immediately before the point of the tool-like portion penetrates the shoulder area of the compensating vessel.

The steps of this method may be executed so that with inserting the neck into the receiving portion the walls of the compensating vessel are spread apart by the cross member. This spreading movement is transferred to the outer walls by said projections. By this step the volume of the sealed chamber of the container is increased and a vacuum is created. As next step the tip of the tool-like portion penetrates the shoulder and thus breaks the seal. At the beginning of penetration the hole in the shoulder is so small that there remains in the chamber a lower pressure compared to the ambient pressure. This pressure difference as well as the air stream from the outside through the small hole into the chamber ensure that no fluid leaks out although the container is turned overhead. As a last step and immediately after piercing the shoulder area the neck is sealingly received in and connected to the receiving portion of the dosing means. All these steps are completed one after the other during one short and steady linear movement of container and dosing means towards each other.

In the following the invention is more closely described, by way of an example, with reference to the accompanying schematic drawings, in which FIG. 1 shows a lateral view of the device in operating position.

FIG. 2 shows a vertical section along the line II—II.

FIG. 3 shows a lateral view of an alternative embodiment of the invention.

FIG. 4 shows a vertical section through the container of FIG. 3.

FIG. 5 shows a vertical section through the dosing means, to which the container of FIGS. 4 and 5 is to be connected and FIG. 6 shows a simplified cross-section through a part of the new device according to FIGS. 3–5.

The entire device according to FIGS. 1 and 2 is referred to by reference numeral 1. It consists of a container 2, preferably made from thinwalled plastics material which in cross-section perpendicular to the container axis 9 is of oblong, approximately rectangular configuration. The lateral walls 4 and 5 covering a large area are comparatively highly flexible due to the thinwalled material and the extension. In operating position, as shown in FIGS. 1 and 2, the container 2 is turned overhead. In this position the container blends into a conical area 2a below, which opens into a neck portion 6. The neck portion 6 is provided for instance with an external thread and defines the discharge opening of the container pointing downward during operating position.

In the plotted operating position the dosing means 3 is sealingly connected with the neck portion 6 of the container. The dosing means is connected with the neck portion 6 by means of a screw cap 17 which can be screwed on to the thread portions of the neck. The dosing means is provided with a valve housing 16 which with a cylindrical portion and interconnection of a seal can be inserted into the inside of the discharge opening and held in said position by the screw cap 17. The housing section 16 carries a constricted oblong cylindrical portion 15 which with its lower end communicates with a tapered outlet opening. Within the portion 15 there is arranged an axially slidable valve member 18 which is in the form of a hollow cylinder and with its inside defines a dosing chamber 20. Said dosing chamber ends below in lateral outlet openings 21 which in the represented position of the valve member reciprocating as indicated by the double arrow are closed by a valve head 22. Reciprocating of the valve member 18 is performed by means of an electromagnetic coil, not shown, which concentrically surrounds the housing portion 15.

After the inside 8 of the container 2 is filled, the latter is hermetically closed by inserting a hood-shaped compensating vessel 7 which is open toward the outlet opening of the container only. To this end, the rim 11 of the compensating vessel 7 is sealingly connected with the container neck. In the represented example the compensating vessel has a shoulder portion 10 radially extending in the neck area and forming an engaging point for chisel-like tools 30 fixedly assigned to the dosing means 3. When the dosing means is applied to the container neck and the screw of the cap 17 is tightened, the blade-shaped tools 30 penetrate the adequately thin-walled shoulder area 10 of the compensating vessel, thus exposing one or more connecting openings between the inside 8 of the container 2 and the dosing means so as to permit the liquid, according to the arrow 32, to flow through the pierced circumferential portion 31 and the opening thus formed by urging the same radially inwardly on account of the chisel-like shape of the tool 30 into the dosing chamber 20 of the valve member, i.e. through the inlet opening 23 of the valve housing exposed in the lower position of the valve member 20.

A lug 24 projects centrally from the housing 16 in alignment with the dosing chamber 20 upward into the inside of the compensating vessel 7. To this lug 24 a small air tube 27 is secured, which opens into the chamber 45 of the compensating vessel adjacent the bottom 14 of the said compensating vessel 7. A second small air tube 26 opening in the same area is tightly connected with a connecting piece 25 of the housing 16, by which the air tube 26 is in constant communication with the ambient atmosphere, so that in the shown position the inside of the compensating vessel 7 is constantly communicating with the outer atmosphere, whilst the dosing chamber 20, simultaneously, is likewise constantly vented via the air tube 27 and the compensating vessel under atmospheric pressure. Hence, the air contained in the dosing chamber 20, upon flowing in of the liquid, can be urged into the compensating vessel, whilst upon actuation of the magnetic coil (not shown) and lifting of the valve member 18, the liquid may flow out of the dosing chamber 20 and air may enter accordingly from the compensating vessel via the venting channel 27 into the dosing chamber 20.

In the represented example, the compensating vessel 7 is divided into two partial chambers, when the container 2 is connected with the dosing means 3 to form the device ready for use, namely, in a chamber 45 adjacent the bottom 14 of the compensating vessel 7 and a chamber 46 closer to the dosing means. The partition is performed by a transverse wall 43. The latter is secured to a hub 41 and terminates radially outwardly in supporting members 42 which, when the dosing means is inserted into the container, are sliding into the compensating vessel, tightly contacting the inner wall thereof. The arrangement of the partition wall 43 is such, that in mounted condition the bridge of material formed of the members 43 and 42 is in alignment, transversely of the axis 9 of the container, with two projections formed on the two flexible lateral walls 4 and 5 of the container, for instance as shown in the drawing, in the form of inwardly pressed small cup-shaped projections 12 and 13. In transverse direction to the axis 9 said projections are so dimensioned that between the same there is formed a clear space which corresponds substantially with the transverse dimension of the bridge of material formed by the members 41 to 43. When upon assemblage of the container and the dosing means the bridge of material is thus pushed into the compensating vessel, it arrives between the two projections 12 and 13, forming with the same a rigid cross support of the flexible walls 4 and 5, so that the latter are prevented from compression, even if the container is inexpertly handled. This measure will completely preclude a change of volume of the inside 8 of the container after the container 2 has been connected with the dosing means 3. It is thus likewise impossible that the liquid be urged by exterior pressure along the tools 30 into the inside of the compensating vessel.

In the depicted example the bridge of material forms at the same time the partition wall. To this end, the member 42 is in the form of a hollow cylindrical apron which in a piston-like manner contacts the inside of the compensating vessel. The partition wall 43, which fills in the entire cross-section, proceeds from the upper edge of the collar 42 and is tightly connected with the hub portion 41. Connection between the two chambers 45 and 46 thus formed is established by perforations 44 of small cross-section provided in the bridge of material 40.

Expediently, the arrangement is to the effect that toward the bottom 14 of the compensating vessel 7 the partition wall 43 is of concave shape and in operating position forms a funnel, with the perforations 44 being arranged on the narrowest area respectively the area remotest from the bottom 14 of the partition wall 43 of the bridge 40.

When after assemblage of the container 2 and the dosing means 3 the device is placed on one of its flat sides 4 or 5, the liquid is permitted to flow past the tools 30 into the lower chamber 46 of the compensating vessel 7, but is prevented from entering the rear chamber portion 45 of the compensating vessel on account of the construction of the partition wall 43 and the location of the perforations 44. Should, nevertheless, a small quantity of liquid enter the space 45, said liquid will reliably flow off through the funnel portion 43 and the perforations 44, when the device is moved into operating position according to FIGS. 1 and 2. But practice has shown that under all conditions virtually to be expected penetration of the liquid to the rear chamber 45 is almost impossible, so that also an inexpert handling of the device does not interfere with its efficiency.

The bridge of material 40 is constantly connected with the small venting tubes 26 and 27 and with the dosing means 3 and represents that portion which is suited for repeated use.

If required, the lateral walls 4 and 5 may be provided with additional ribs or like deformations distributing the supporting effect of the cup-shaped projections 12 and 13 over the entire extension of the container walls 4 and 5. There may also be provided deformations other than the depicted cup-shaped projections.

In cases where a subdivision of the compensating vessel 7 into two chambers can be renounced, it will suffice that the bridge of material 40 provides but a mechanical and rigid connection between the deformations of the container walls in assembled condition. But a dynamically balanced construction of the bridge 40 is recommendable in all cases in which no predetermined circumferential position is provided for between the container 2 and the dosing means 3 for the connection. The position of the bridge of material depends on the dimensions and on the shape of the container and should be so selected that an optimum support of the container walls 4 and 5 protecting the same from bending out in assembled condition is ensured. This construction permits providing the container and the compensating vessel with very thin walls.

In some cases there will suffice for the support the contact between parts 12, 13 and part 7. As a result thereof the internal part 40 may also be absent. Particular preference is to be given to the embodiment of part 40 as demonstrated in the Figure.

In the second example according to FIGS. 3-6 the container 51 is similar to the container 2. The container consists of a body 53 of oblong, rectangular cross-section. At least the lateral walls 57 and 58 are quite flexible compared to the more stiff neck portion 54, which ends in an annular sealing face 56. The neck comprises a circumferential locking bead which function will be mentioned below.

The neck limits the only opening 110 of the container. Hermetically sealed to the sealing face 56 is the compensating vessel 114, which is arranged inside the container and seals hermetically the inner chamber 117, filled with the fluid. The vessel consists of flexible material for example plastics and comprises a shoulder portion 115 which may be penetrated by the tip 137 of the blade like tool 135.

In relaxed condition the vessel 114 has a circular cross-section shown in full line in FIG. 6 and has a diameter 120. The distance 113 between the opposing faces of the two projections 111 and 112 is clearly smaller than the diameter 120. Thus, in the filled condition of the container, the compensating vessel is deformed or compressed by the projections 111 and 112 as clearly shown in FIG. 4 and—in broken lines—in FIG. 6. Under this condition the cross-section of vessel 114a is about oval.

The inner side 119 of the vessel is open to the ambient atmosphere. The axial distance 118 between the shoulder 115 and the nearer edges of the two projections is smaller than the axial distance 136 between the tip 137 of the blade like tool 135 and the remote edge 138 of a cylindrical bridge member 142, the diametrical portions 140 and 141 of which are adapted to bridge the space 113 between the projections 111 and 112 in the manner described above. The diameter 134 of the bridge member is remarkably greater than the space 113. Thus, when the bridge member is forced into the vessel 114, the vessel is stretched and the projections will be spread apart as well as the outer walls 57 and 58 of the container. The result is a net increase of the inner volume of the filled chamber 117. As this chamber is hermetically sealed, the increasing volume results in a decrease of pressure.

Having in mind the differences of diameters and distances it becomes clear that the first step in connecting the container and the dosing means will be decreasing the pressure in the chamber 117. During the next step the tip 137 will penetrate the shoulder 115. The opening will be so small that compensating of the vacuum in chamber 117 takes some time. The vacuum together with the entering air stream will positively prevent any leakage of fluid. Immediately after piercing the shoulder the sealing face 56 of the neck sealingly contacts a sealing member 126 within the groove 127 of the cap like member 125. The bead 54 of the neck snaps into groove 127 and thus locks the neck in the sealed position. All these steps are performed one after the other during a single steady and linear movement of the container—being in an overhead position—towards the dosing device 52. The parts 129, 130, 131 and 132 are corresponding to parts in FIGS. 1 and 2 and need no further description.

The embodiment of FIGS. 3 to 6 results in a very easy handling of the container. The dosing device may remain stationary and fixed to a vending machine. The filled and closed container is turned overhead and merely pused into the cap-like member until bead 55 snaps into groove 127.

During this straight pushing movement the vacuum is established in chamber 117, the shoulder 115 is broken and the sealing connection is performed. There is no need for any screwing motion. In spite of the overhead position of the container, there is no danger of spilling the fluid.

I claim:

1. A device for metered dispensing of liquids, in particular concentrates or syrups, for the production of beverages, comprising a conveying and dispensing container for the liquid having at least two oppositely arranged flexible wall portions, a hood-like compensating vessel constantly connected with the outlet opening of the container and arranged within said container and being open towards said outlet opening only, and a dosing means which, before the device is put into operation, can be connected with the outlet opening of the container and is provided with a dosing means of which the inlet and outlet is controlled by a valve, said dosing means being provided with venting passages which, when the dosing means is connected with the container, open into the compensating vessel, connecting the same at the one side with the ambient atmosphere and at the other side with the dosing chamber, characterized in that the container and the dosing means are provided with rigid supporting members which, in connected condition of container and dosing means, form a continuous reinforcing bridge between the two opposed flexible wall portions of the container.

2. A device as claimed in claim 1, characterized in that the two flexible wall portions are provided with projections in alignment with each other, which project from the inner surface toward the container axis and terminate each adjacent the side of the compensating vessel facing the same.

3. A device as claimed in claim 2, characterized in that the dosing means has a cross member which in connected condition of container and dosing means is located in the compensating vessel and of which the cross-sectional extension corresponds approximately with the clear space between the projections.

4. A device as claimed in claim 3 characterized in that the cross member is simultaneously provided with a partition wall portion occupying the cross-sectional clearance of the compensating vessel and connected with two venting tubes penetrating said partition wall portion.

5. A device as claimed in claim 4 characterized in that the cross member consists of an annular collar movably but closely engaging the inner surface of the compensating vessel and of a partition wall concavely shaped toward the bottom of the compensating vessel, which preferably are integral one with the other, and is supported by one of the two venting tubes, especially by a hub-like portion.

6. A device as claimed in claim 5, characterized in that the partition wall, in an area remote from the bottom of the compensating vessel, is provided with one or several perforations having a cross-sectional width smaller than the clear space of the compensating vessel.

7. A device as claimed in claim 1, characterized in that the dosing means has a cross-member which is connected condition of container and dosing means is located in the compensating vessel and in that the diameter of said cross-member is greater than the clear space between said projections before inserting the cross-member into the compensating vessel.

8. A device as claimed in claim 7, wherein the compensating vessel includes a shoulder area adjacent the outlet opening of the container and the dosing means includes a tool-like portion adjacent the shoulder area of the compensating vessel and a cross member having an axially close edge and an axially remote edge with respect to the shoulder area and tool-like portion, characterized in that the axial distance between the shoulder area and the closer edge of said cross-member is smaller than the axial distance between the point of said tool-like portion and the remote edge of the cross-member.

9. A device as claimed in claim 2, characterized in that the projections have end faces in the original form of the container and in that the compensating vessel originally has a circular cross-section having a diameter greater than the clear space between the end faces of said projections and in the original form of the container.

10. A device as claimed in claim 1, characterized in that the container has a neck and the dosing means has a receiving portion and the neck of the container and the receiving portion of the dosing means are connectable to each other in a snap-like axial movement.

11. A method for introducing the neck of a conveying and dispensing container for liquids, in particular concentrates or syrups, into a cap-like receiving portion of a dosing means, in which the outlet opening of the container is hermetically sealed by a hood-like compensating vessel constantly connected with the outlet opening and arranged within said container and in which a tool-like portion of said dosing means penetrates a shoulder area of the compensating vessel when the neck of the container, in a turned overhead position, is pushed into the receiving portion of said dosing means, characterized in that in the liquid containing chamber of the container there is created a vacuum by deforming the outer wall of said container immediately before the tool-like portion penetrates the shoulder area.

12. A method according to claim 11, characterized in that with inserting the neck into the receiving portion the walls of said compensating vessel are spread apart and the spreading movement of these walls is transferred to the outer walls of said container, followed by the step that the tool penetrates the shoulder area and immediately after penetration the neck is sealingly connected to the receiving portion, and in that all these steps are completed one after the other during one steady and linear movement of container and dosing means towards each other.

* * * * *